INVENTOR
*TIBOR ARVAI*
BY
ATTORNEY

May 28, 1968  T. ARVAI  3,385,519
CALCULATING MACHINES
Filed Jan. 23, 1967  11 Sheets-Sheet 7

INVENTOR
TIBOR ARVAI
BY
ATTORNEY

May 28, 1968  T. ARVAI  3,385,519

CALCULATING MACHINES

Filed Jan. 23, 1967  11 Sheets-Sheet 9

INVENTOR
*TIBOR ARVAI*
BY
ATTORNEY

May 28, 1968 T. ARVAI 3,385,519
CALCULATING MACHINES
Filed Jan. 23, 1967 11 Sheets-Sheet 10

INVENTOR
*TIBOR ARVAI*
BY
ATTORNEY

United States Patent Office 3,385,519
Patented May 28, 1968

3,385,519
CALCULATING MACHINES
Tibor Arvai, Paris, France, assignor to Sperry Rand Corporation, New York, N.Y., a corporation of Delaware
Filed Jan. 23, 1967, Ser. No. 611,037
Claims priority, application France, Jan. 29, 1966, 47,727
7 Claims. (Cl. 235—60)

ABSTRACT OF THE DISCLOSURE

In response to the actuation of selected keys in a keyboard, flexible interconnecting rods actuate value representing pins in successive columns of pins in a pin box carried by a carriage which moves successively to the next higher value representing pin columns with the actuation of each key, thus to effect successive entry of decimal values into a printer and accumulator. Interlocks prevent cycling of the mechanism during entry of a value in the keyboard and vice versa.

Background of the invention

The present invention relates to adding or calculating machines of the ten key type. In particular, the invention is concerned with a keyboard and data entry device and the several mechanisms which may be associated therewith.

Adding and calculating machines of the ten key type are well known and well represented by prior art. In general such machines are fairly complex in their construction with the result that manufacture and assembly thereof is time consuming and therefore costly. Furthermore, the relative complexity may readily lead to breakdowns and the necessity for frequent servicing and repairs.

In a complex machine such as a mechanical calculator it is evident that the greatest of care must be exercised in design and construction in order that all parts may properly cooperate. A simplification in any one part may readily lead to serious complications in other parts. To achieve an overall simplification the entire structure must be reviewed. Thus for example in U.S. Patent 2,667,304 there is shown, inter alia, an arrangement for transmitting motion from a keyboard to a set of data entry pins. However the overall design is such as to introduce considerable complexity into the escapement and carriage return mechanisms. A simplified pin carriage arrangement is shown in U.S. Patent 3,095,143 but again complications arise in the escapement and carriage return mechanisms as well as the pin carriage construction itself.

The present invention seeks to overcome these disadvantages by a novel design for a keyboard and data entry device which utilizes far fewer parts to accomplish the same functions as in prior art machines. In particular, the constructional features and designs shown by the present invention are adapted to be produced almost entirely from moulded plastic parts. It has been found possible through adoption of the present designs to eliminate and simplify many parts so that aside from a few springs and clips no metal parts are required. It is noted in particular that assembly of the present invention does not require the use of metal fastenings such as bolts, nuts or rivets and in fact the simplification and rationalization have been such as to reduce to a considerable degree the necessity for the employment of skilled labour.

Summary of the invention

In particular the invention provides a novel keyboard entry and related mechanism in which a pin carriage is provided having integrally formed springs to retain the data entry pins in one or the other of two positions. One of the pins which serves to enter data, simultaneously operates to initiate escapement of the carriage. An arrangement of flexible push rods is employed to transmit motions from the keyboard to the pins in which the data entry pin serving to initiate escapement is actuated by any key. An action key is provided which through simplified linkages not only enables initiation of a machine cycle but provides for carriage return. An interlock arrangement is also provided which ties together the operation of the action key and the data entry keys so that simultaneous operation of said action key and a data entry key is prevented.

Description of the preferred embodiment

Figure 1:
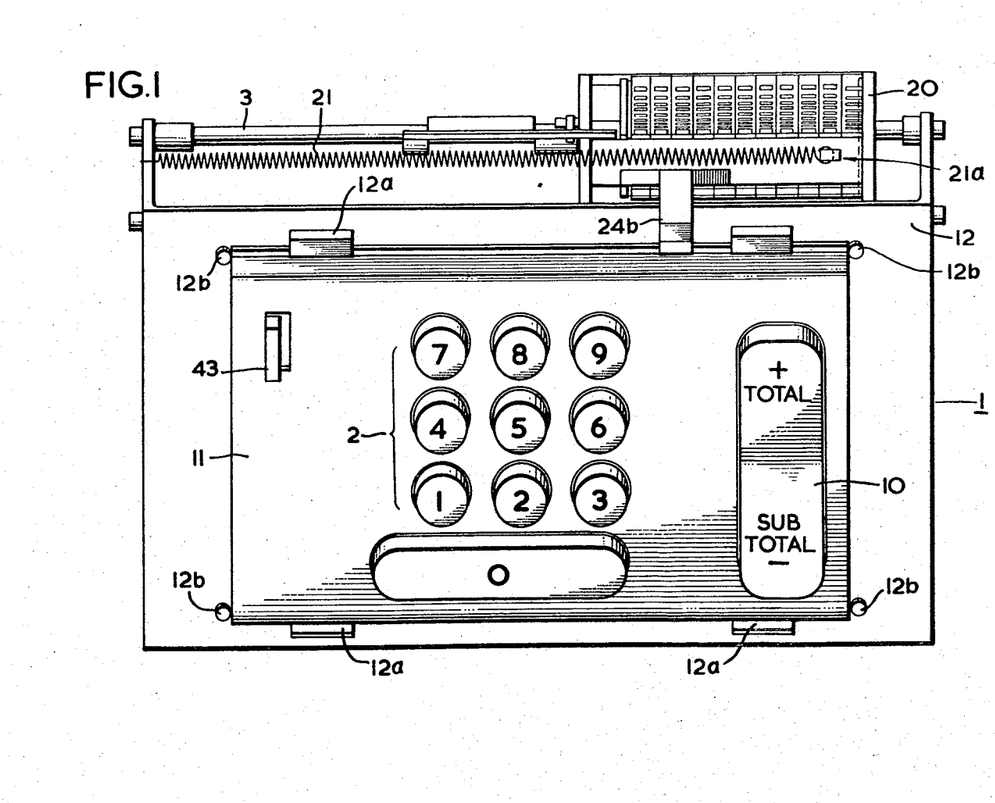
FIGURE 1 is a top view of the keyboard and data entry mechanism.

The main frame of the machine is shown at 1 in FIGURE 1 and may comprise a single plastic moulding. Studs are shown at 12b which serve to locate a casework 11 which may be retained in place by hooks 12a. Such casework 11 is likewise designed to be formed by a single moulding and assembly may be effected through deformation of the hooks. Projecting from the casework 11 will be observed a group of keys corresponding to the digits 0 to 9 and additionally will be noted an action key 10 and a repeat key 43. At the top of FIGURE 1 may be seen rail 3 which serves in conjunction with rail 4 (FIGURE 2) to support a data entry pin carriage 20. Such pin carriage serves to receive and store digits from the data entry keys 2 and to be progressively stepped towards the left as viewed in FIGURE 1 with each digit which is entered. Spring 21 for this purpose is utilized to urge data entry carriage 20 to the left and such spring is attached to carriage 20 by hook 21a. Attached to carriage 20 and projecting toward the keyboard is lever 24b which may be used to clear the mechanism by returning the carriage toward the right in a well-known manner.

Figure 2:
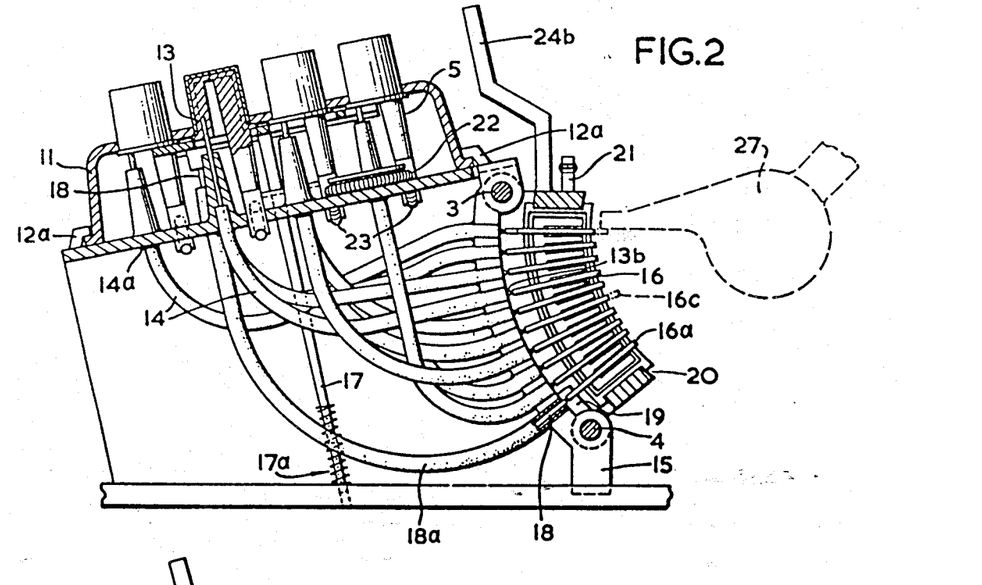
FIGURE 2 is a cross-sectional view showing the data entry key mechanism and the data entry carriage.

Refer now to FIGURE 2. This shows a cross-section of FIGURE 1 and in particular while omitting the action key mechanism and the repeat key mechanism, shows in detail the connection between the keys and the data entry carriage. To each key corresponding to the digits 0 to 8 is fastened a flexible push rod 13 which may be conveniently formed from a plastic material. Each push rod in turn is surrounded by a sleeve 14 likewise conveniently formed of plastic material. Sleeves 14 are respectively fastened at one end of the main frame and at the other end 14b to a collector 15. It will be seen that depression of any of the keys 0 to 8 will effect a movement of its corresponding push rod through the sleeve so that the end 13b will project therefrom. The end 13b of the push rod is adapted to engage and shift the position of a corresponding pin 16 in the data entry carriage 20. A pin is shown in displaced position at 16c.

In addition to the foregoing, all keys act on a T bar 17. T bar 17 in turn operates through a push rod 18 slidable in sleeve 18a to depress pin 16a corresponding to digit 9. It may be seen accordingly that if the digit key corresponding to number 9 is depressed, this will effect depression of the T bar only and will result in causing pin 16a to project from the data entry carriage. Depression of any other key will result in projection of the pin corresponding to that key and the pin corresponding to number 9. The pin 16a corresponding to digit number 9 is used not only to enter digit 9 into the machine, but at the same time to enable the progressive escapement of the carriage by means which will become evident hereinafter.

Key return is effected by means of a coil spring 22 which is wound among holes moulded in the main frame and which passes under studs 5 forming an integral portion of the key mouldings. The arrangement of spring 22 is shown at 23 in FIGURES 2 and 3. T bar 17 is urged toward its initial position by means of spring 17a.

Figure 3:
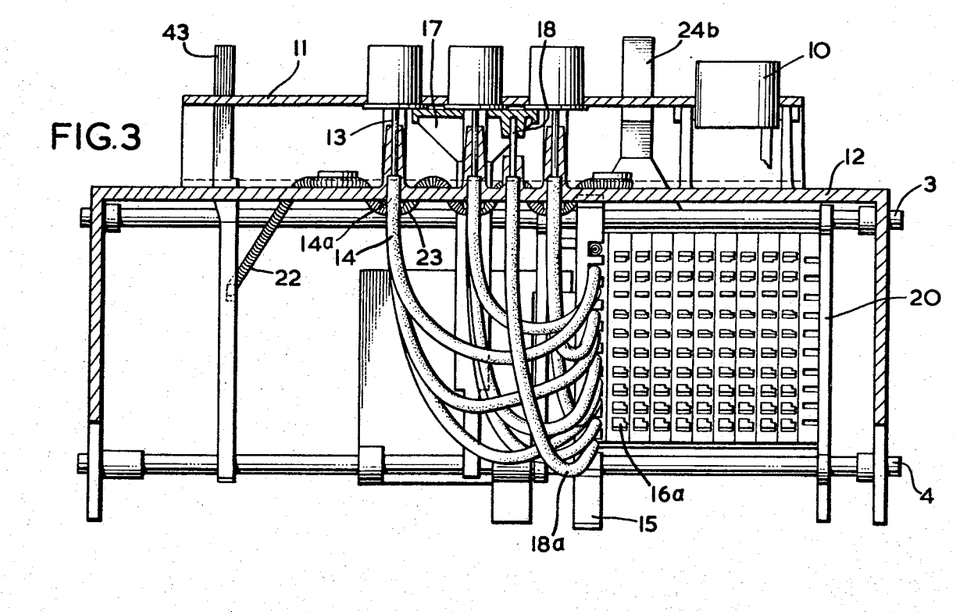
FIGURE 3 is a front sectional view showing basically the same mechanism as FIGURE 2.

The mounting of data entry carriage on its rails 3 and 4 is shown in cross-section in FIGURE 2 and in front section in FIGURE 3. Shown also in skeleton outline in FIGURE 2 is a mechanism 27 which may be displaced an angular distance determined in accordance with whichever pin projects. Such an arrangement may take any one of several well known forms and does not form a part of this invention.

Figure 6:
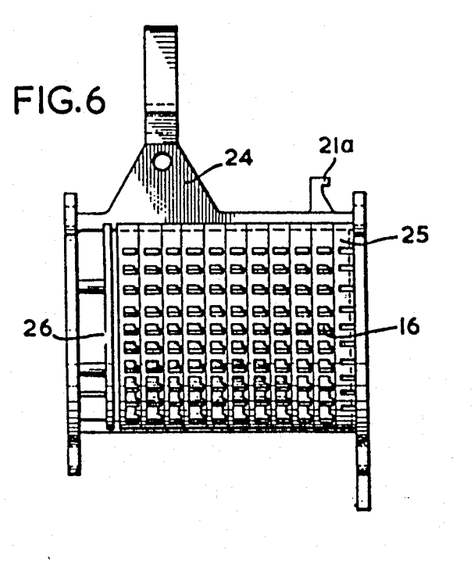
FIGURE 6 is a front view of the carriage.
Figure 7:
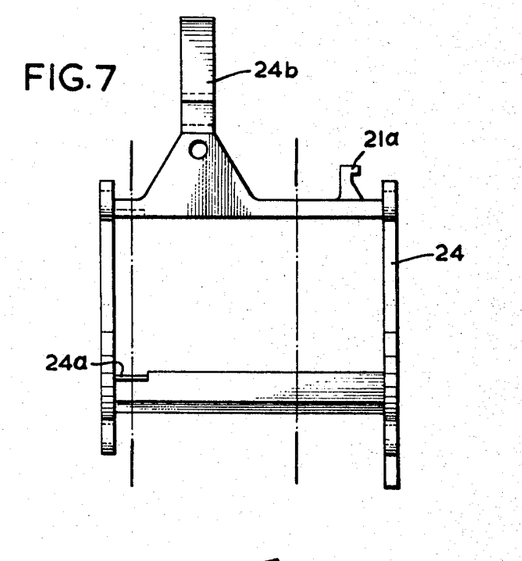
FIGURE 7 is a front view of the basic carriage framework.
Figures 8, 9:
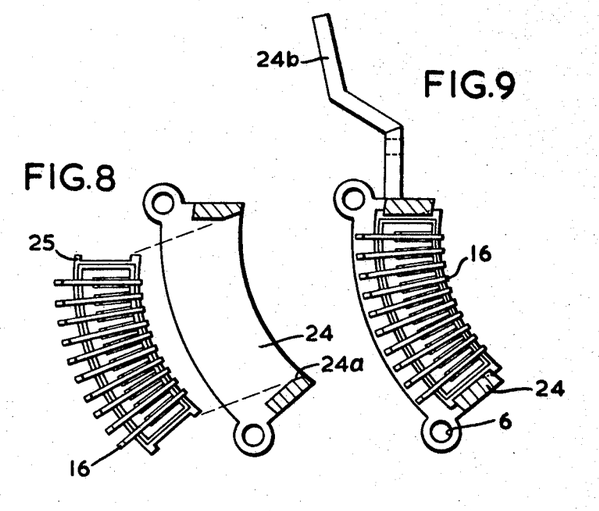
FIGURES 8 and 9 show a segment of the data entry carriage before and after assembly.
Figure 10:
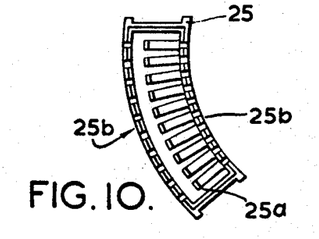
FIGURE 10 shows a single segment before the pins are mounted therein.
Figure 11:
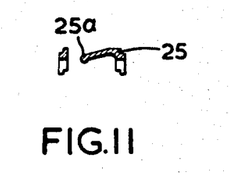
FIGURE 11 is a cross sectional view of a segment without pins.
Figure 12:
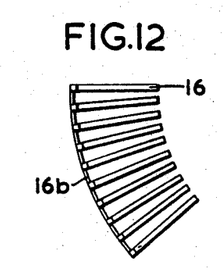
FIGURE 12 shows a cluster of pins as obtained from a mould.
Figure 13:
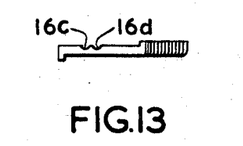
FIGURE 13 is an end view of FIGURE 12 indicating at the same time the profile of a pin.
Figure 14:
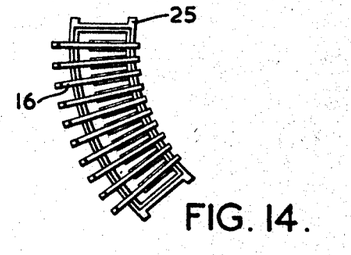
FIGURE 14 shows an assembly of the pins of FIGURE 12 with the segment of FIGURE 10.
Figure 15:
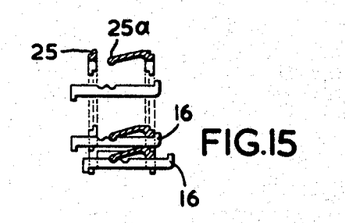
FIGURE 15 shows in section the insertion of the segments and pins.
Figure 16:
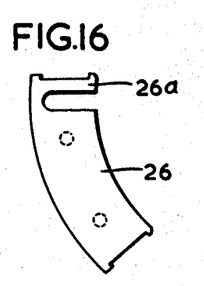
FIGURE 16 shows an abutment member used to hold the segment in place once they are assembled into the framework shown in FIGURE 7.
Figure 17:
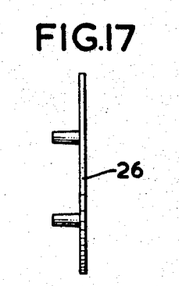
FIGURE 17 is an edge view of FIGURE 16.

Consider now the constructional details of the pin carriage entry mechanism. This is shown in FIGURES 5 to 17 inclusive. FIGURE 7 in particular shows the one piece formation of the basic carriage framework. This may be integrally formed, with lugs pierced as indicated at 6 (see FIGURE 9), with a hook 21a, and with a passage as shown at 24a to permit easy assembly and mounting on rails 3 and 4. Also formed with the framework is lever 24b which, as previously mentioned, serves as a manual clear and carriage return.

Segments 25 are moulded or formed likewise in a single piece with leaf springs 25a and notches 25b. Such notches serve to receive and guide the individual pins for each of the segments. As shown more particularly in FIGURES 12 and 13 pins are formed or moulded in clusters held together by an injection band 16b. Following assembly with a segment such band 16b may be cut away so that the pins are thereafter individually freed. In each pin 16 there is formed during and by the moulding process notches 16c and 16d. Leaf spring 25a formed as an integral portion of the segment 25 is adapted to bear against said notches 16c or 16d depending upon the position of the pin so as to tend to maintain said pin either in its projected or retained position. This is more particularly shown by FIGURE 15. Thus, it may be seen that segments 25 provide both the guides and the springs for the numbered pins. In FIGURE 6 there is shown the complete stack following assembly. Each segment bears against its neighbour and when all stacks have been placed into position, retaining member 26 may then be introduced via passage 24a so as to bear against and retain the stack of segments 25 in their final position.

*Operation*

It is believed that in most respects the operation of the data entry mechanism will be evident from the foregoing description. Some words of explanation are believed to be in order regarding the escapement of the data carriage. As previously mentioned, any of the data entry keys upon being depressed will cause the pin 16a corresponding to digit No. 9 to be projected via push rod 18 actuated by the T bar assembly 17. It will be further recalled that the carriage assembly is continually urged toward the left by spring 21 (see FIGURES 1 and 4). In their inactive position any of the pins 16a corresponding to digit 9 will abut against a projection 19 on collector 15 (see FIGURE 2) preventing movement of the carriage. Thus when the first digit is entered, pin 16a of the first column will be projected permitting spring 21 to move the carriage a distance corresponding one digital column to the left whereupon projection 19 will engage the adjacent pin 16a of the as yet unactivated second decimal column. When the second entry is made pin 16a corresponding to this column will be similarly projected and the carriage once again permitted to step. This process will be continued until all decimal columns are filled and the carriage has reached the end of its possible travel.

*Action key*

The action key shown as 10 on FIGURE 1 is utilized to set the mechanism forming an adding or calculating machine in motion and eventually to bring about carriage return and clearing. Since the present invention relates primarily to a keyboard, entry and related mechanisms, it is obvious that various means of transmission may be adopted and these will depend upon the particular calculating mechanism with which the present invention may be used in connection with this action key. However, it is believed desirable to show how a calculator action may be engaged and at the same time to show details of the interlock which prevents attempts to enter simultaneously data whilst setting the calculating mechanism in motion.

Figure 18:
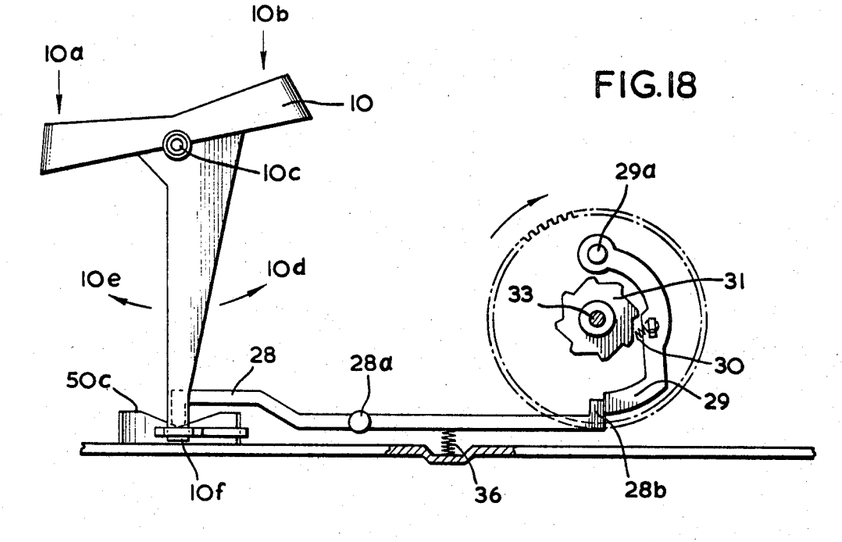
FIGURE 18 shows the mechanism by which the action key of the machine is effective before such has been actuated.
Figure 19:
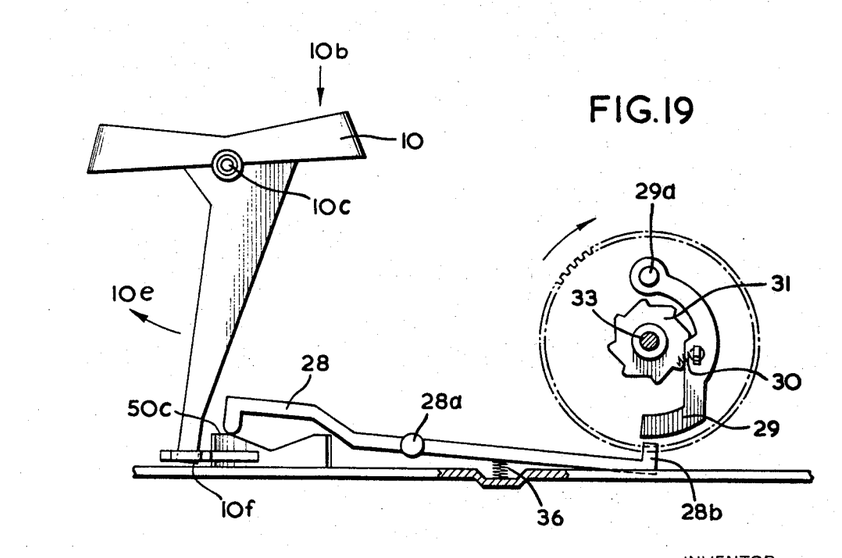
FIGURE 19 shows the same mechanism as FIGURE 18 following actuation of said action key.
Figure 21:
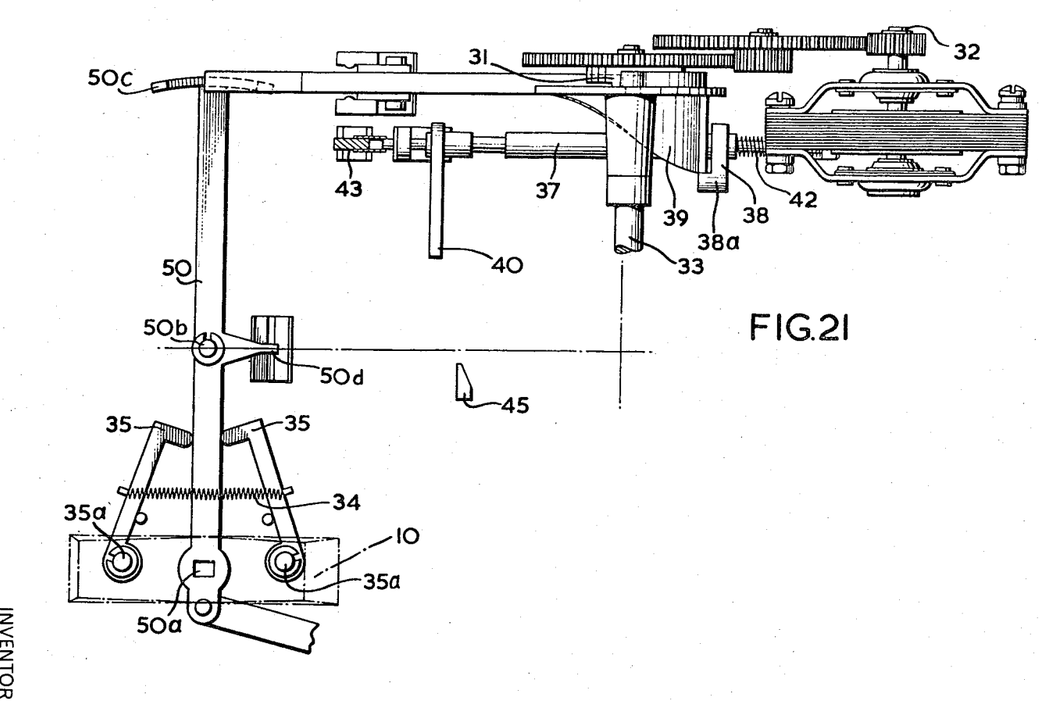
FIGURE 21 is a top view of the same mechanism as shown in FIGURE 20.

FIGURES 18, 19 and 21 show details of the linkages by which the action key may communicate with the rest of a suitable mechanism. Action key 10 comprises a rocking lever which may have extremities 10a and 10b and which is mounted on a pivot 10c. It may be moulded to an extension having an extremity 10f and it may be readily appreciated that by depressing end 10a or end 10b according to the requirements an angular motion of the extremity 10f will be obtained whereby such motion may be in directions 10e or 10d.

Lever 50 as shown to best advantage in FIGURE 21 is arranged to pivot horizontally around pivot 50b and is mounted on the base plate of the machine. At the end of lever 50, as located under the action key 10, is a notch 50a which receives the extremity 10f forming part of the action key moulding. It will be appreciated that by rocking action key 10 about its pivot 10c an angular motion of lever 50 will be obtained at its pivot 50b. At the other end of lever 50 is an integrally formed cam 50c the profile of which may be observed from FIGURES 18 and 19. Lever 28 pivoting at 28a has one end formed as a cam follower and engages cam 50c. From the profile of cam 50c it will be evident that no matter which direction action key 10 is depressed, lever 28 will be raised against the urging of compression spring 36. The other end of lever 28 indicated at 28b and as shown more particularly in FIGURES 18 and 19 will in the inactive position bear against a pawl 29 so as to maintain said pawl disengaged from a ratchet 31. Said ratchet 31 is mounted on a shaft 33 which may be termed the general shaft and which may serve to carry the various cams for bringing about desired operations in an adding or calculating machine. Said ratchet 31 may be loosely mounted on said shaft and fixed to a gear (see FIGURE 21) driven through a train of gears from an electric motor. The pawl however will be fastened through suitable means to the general shaft so that when said pawl engages the ratchet the general shaft will be forced to turn with the pawl.

Upon comparing FIGURES 18 and 19 and considering the system of levers as shown to best advantage in FIGURE 21, it will be evident that upon operating the action key, lever 28 will have its end 28b withdrawn from pawl 29. Pawl 29 will then be urged by spring 30 into engagement with ratchet 31. Suitable electric switch means (not shown) may be provided so that at the same time the motor is switched on thereby rotating ratchet 31 in the clockwise direction as shown in FIGURES 18 and 19. Rotation of the general shaft will be continued for as long as action key 10 is maintained depressed. However, it is evident that as soon as action key 10 is released lever 28 under the urging of spring 36 will return to its initial position. Thus as soon as the general shaft has completed a revolution, it will be stopped and held in its initial position by the re-engagement of end 28b of lever 28 with pawl 29.

*Carriage return*

Figure 4:
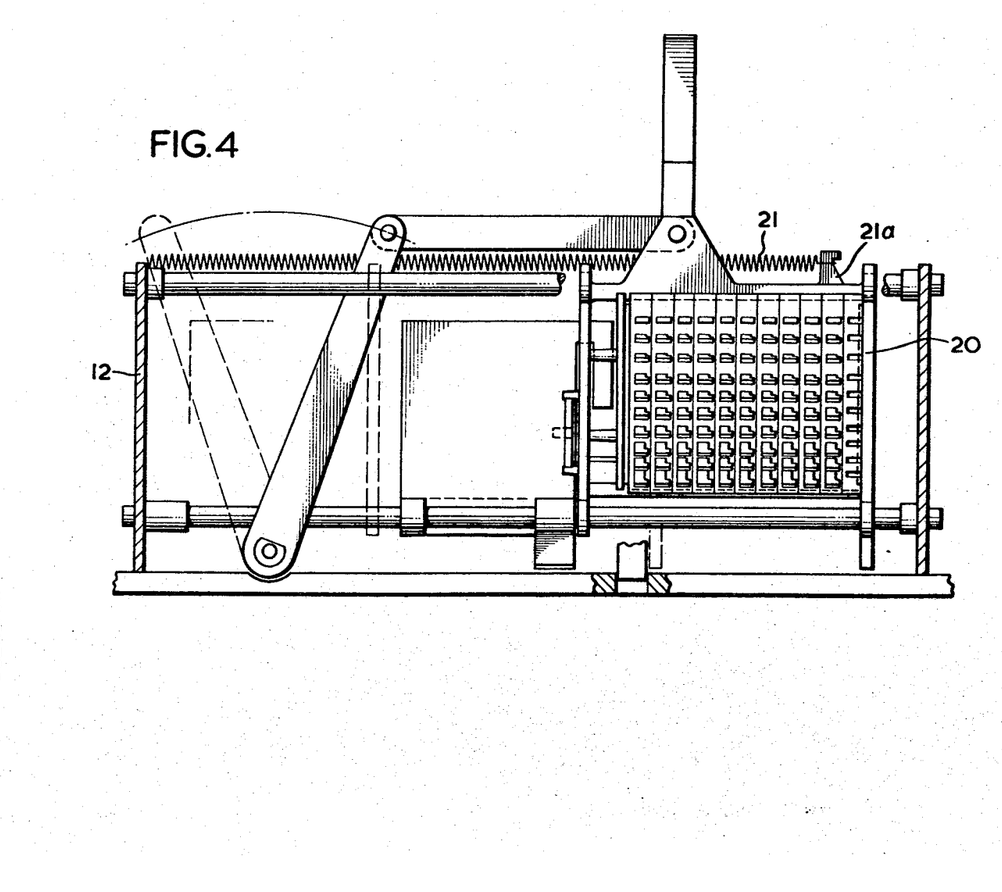
FIGURE 4 is a front sectional from which the keyboard and its connections have been eliminated so as to show mounting of the data entry carriage.
Figure 5:
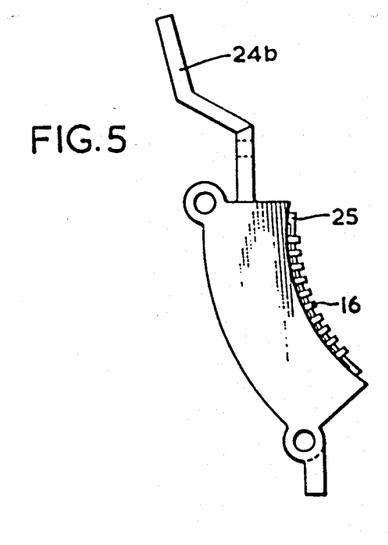
FIGURE 5 is a side view of the data entry carriage.
Figure 20:
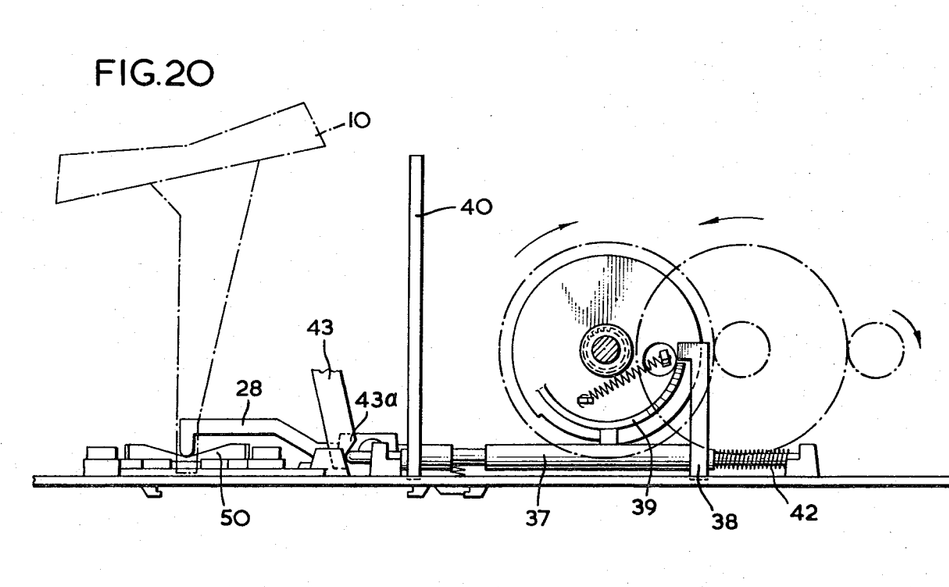
FIGURE 20 shows a cross-section of the data entry carriage return mechanism.
Figure 22:
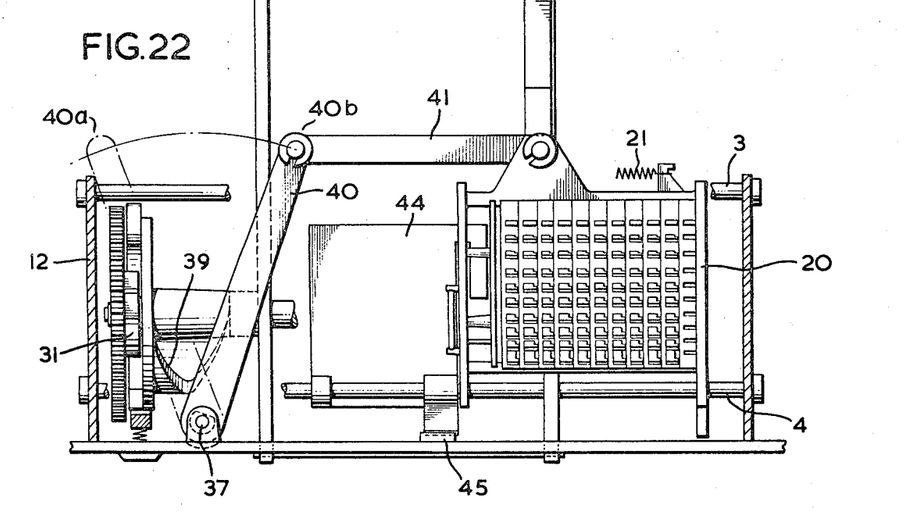
FIGURE 22 is a front view of the same mechanism as shown in FIGURES 20 and 21.
Figure 23:
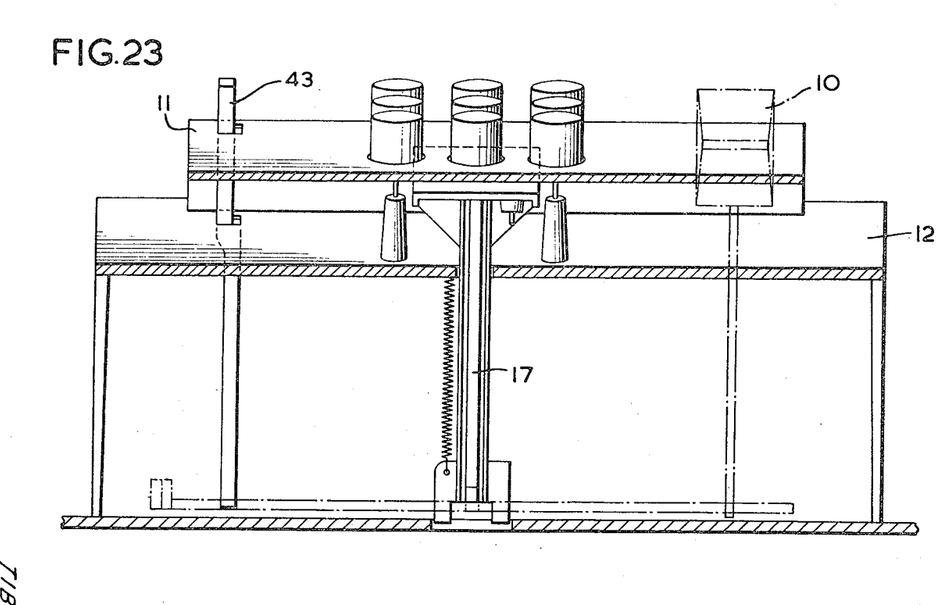
FIGURE 23 is a front sectional view of the keyboard showing an interlock between the data entry keys and the action.

The carriage return mechanism is shown partially in FIGURE 4 and in greater detail in FIGURES 20, 21 and 22. Attached to the general shaft 33 is a cam shown in profile at 39 (see FIGURES 21 and 22). Shaft 37 is arranged to be both longitudinally slidable and to be capable of rotating. Said shaft is urged in its longitudinal direction toward the front of the machine by compression spring 42. Formed integrally with said shaft 37 is lever 38 carrying at its outer extremity cam follower 38a arranged so as to engage the profile of cam 39. At the other end of shaft 37 and likewise formed integrally therewith is mounted lever 40 and as best shown in FIGURES 20 and 22 said lever projects upwardly. Said lever 40 is pivotally connected to lever 41 which in turn is loosely connected to the pin carriage.

It will be evident that when digits have been entered into said pin carriage the same will be shifted to the left to an extent determined by the number of decimal columns which have been filled. Upon actuation of the operating key 10 and as explained hereinabove, the general shaft will be rotated through at least one revolution thereby causing cam 39 to rotate through one revolution. The engagement of cam follower 38a effects the turning of shaft 37 in the clockwise direction as shown in FIGURE 22 so that the upper end of lever 40 likewise rotates as shown from postions 40a to 40b. Lever 41 connected to carriage 20 thus shifts said carriage towards the right or in the return direction against the bias of spring 21.

Upon return of the carriage to its extreme right hand position all of the data entry pins previously set to their second position will be restored to their first position. Although not specifically shown in the drawings, mechanisms for effecting such a restoring action are well known in the prior art. In the present instance for example there may be provided a wiper member disposed to the right of the collector 15 as shown in FIGURE 3 and behind the pin carriage. Such wiper member would have a cam surface curved to conform to the curvature of right hand face of the pin carriage as shown in FIGURE 2 and adapted to engage all of the pins. The return motion of the pin carriage would carry it past the wiper so that each pin column in turn would be swept and the displaced pins therein restored to their initial position. The carriage return motion would be continued to the right slightly beyond the initial position of the pin carriage with the profile of cam 39 being such that immediately following the restoring of the pins in the first decimal column, spring 21 would be effective to urge the carriage to the left to the point where pin 16a again engaged abutment 19.

As may be seen from FIGURES 20 and 21, repeat key 43 upon being depressed will engage one end of shaft 37, namely the end towards the front of the machine. In view of the sloping cam surface 43a of said repeat key, shaft 37 will be longitudinally shifted against the bias of spring 42. The effect of such shifting is to disengage cam 38a from cam 39. Thus, should the repeat key be depressed when the action bar is likewise depressed, cam 39 will be ineffective and the carriage will not be returned and will not be cleared. By holding the repeat key depressed during a number of cycles, it will be possible to utilize the present mechanism to obtain multiplications.

*Interlock*

Projecting and formed integrally with lever 50 is stud 50d as more particularly shown in FIGURE 21. On the lower extremity of T bar 17 is formed an enlarged portion 17b having moulded into its inferior portion a notch of inverted T formation. Into such notch may penetrate the stud 50d.

Figure 24:
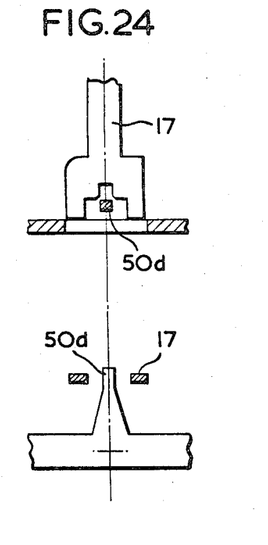
FIGURES 24 to 27 show in cross-section and in plan the various positions which the interlock mechanism may assume in order to be effective.
Figure 27:
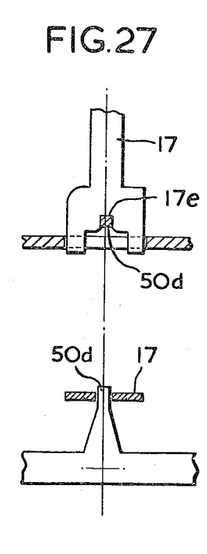

So long as the action key 10 is in its centre position stud 50d will likewise rest in a neutral position and under the centre of the elongated portion of the T shaped notch in T bar 17. In this position as more particularly shown in FIGURE 24 any one of the data keys may be depressed. Should such a data key be depressed, this results in the depression of the T bar so that the stud 50d is caught in the narrow portion of the notch. It will be obvious from FIGURE 27 that this results in locking lever 50 in its centered position so that it will be impossible to actuate action key 10.

Figure 25:
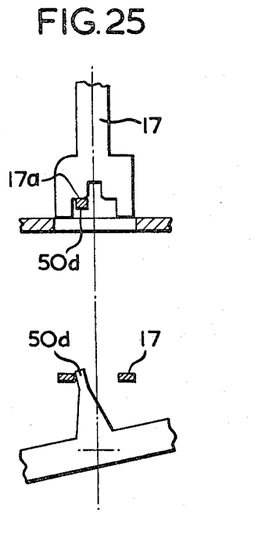
Figure 26:
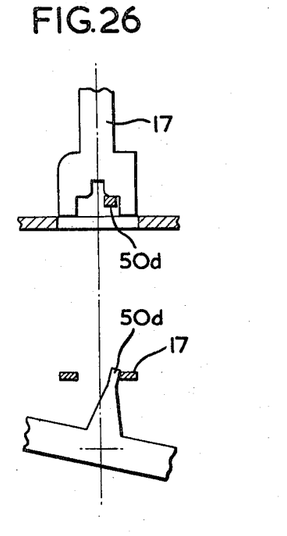

In the event that no data key is depressed, it will be possible to operate action key 10 thereby pivoting lever 50 in either direction about its pivot point 50b. In this event it is clear that stud 50d will be shifted to the right or to the left as shown in FIGS. 25 and 26 so as to be engaged under the shallow portion of the T shaped notch in T bar 17. In this position it is evident that so long as action key 10 is maintained depressed no possibility exists to depress simultaneously one of the data entry keys 2.

*Miscellaneous*

In FIGURE 21 are shown levers 35 pivoting around points 35a and urged toward one another by spring 34. Such levers are used to maintain lever 50 in neutral position so long as action key 10 is not depressed. Such levers will be mounted on the base plate of the machine.

On FIGURE 22 is shown a shutter mechanism 44 which is mounted on the inferior rail 4 and which moves longitudinally with data entry carriage 20. Although not necessary to the carrying out of the instant invention such shutter mechanism may find use in certain machines and may be useful to prevent printing of zeros ahead of digits which have been entered into the pin carriage. In the empty position with the pin carriage completely at the right as shown in FIGURES 1, 3 and 4 shutter 44 will be maintained unactuated by means of cam 45 shown on FIGURES 21 and 22. As soon as the pin carriage has digits entered thereinto and as previously explained, this will be stepped to the left. Shutter 44 is disengaged from cam 45 and may project into the interior of the machine so as to engage suitable mechanism not shown which may block printing of all digits ahead of the last entered decimal column.

The foregoing constitutes a description of a mechanism which may be most suitably constructed entirely from moulded plastic parts aside from several springs and clips. There is however no intention to limit the invention to this or any material in particular and all limitations intended are to be found in the claims attached hereto.

I claim:

1. A data entry mechanism for use in calculators and like machines comprising:
   (a) framework means adapted to receive and to retain a plurality of segments means, each segment means being formed integrally with a plurality of spring means and being provided with a plurality of pairs of notches;
   (b) a plurality of data entry pins each embraced by a pair of said notches and each engaged by a one of said spring means;
   (c) retaining means receivable by said framework means and adapted to maintain said framework, said segment means and said data entry pins in assembly;
   (d) said data entry pins being retained in either a first or a second position by the action of said spring means;
   (e) means for initiating cycles of operation; and
   (f) interlock means to prevent operation of said keys upon initiation of a cycle of operation and to prevent operation of said cycle initiating means upon actuation of said keys.

2. Data entry mechanism according to claim 1 and further including:
   (a) means for returning said framework to its initial position.

3. A data entry mechanism according to claim 2 wherein said means for returning said framework to its initial position includes:
   (a) drive means;
   (b) a camshaft having at least one cam thereon and adapted to be driven by said drive means;
   (c) means intermediate said drive means and said camshaft;
   (d) linkage means actuable from the keyboard and adapted to engage said means intermediate said drive means and said camshaft for at least one full revolution of said camshaft;
   (e) follower means engageable with a cam on said camshaft so as to be moved in response to a revolution of said camshaft; and
   (f) a motion transfer linkage intermediate said follower means and said framework so that during a full revolution of said camshaft said framework is returned to its initial position.

4. A data entry mechanism according to claim 3 and further including:
   (a) repeat key means on said keyboard; and
   (b) means actuable by said repeat key means to disengage said follower means from said cam on said camshaft thereby to disable return of said framework to its initial position.

5. A data entry mechanism according to claim 1 wherein said means for initiating cycles of operation includes:
   (a) key lever means mounted on the keyboard for rocking motion about a pivot;
   (b) first linkage means actuable by said key lever means to turn about a central pivot point;
   (c) cam means borne by said first linkage means;
   (d) second linkage means biased to a first position and movable to a second position in response to motion by said cam means;
   (e) a camshaft;
   (f) drive means; and
   (g) means mounted on said camshaft and actuable to connect said drive means to said camshaft during at least one revolution of said camshaft while said second linkage means is in its second position.

6. A data entry mechanism according to claim 1 wherein said interlock means includes:
   (a) key lever means mounted on the keyboard for rocking motion about a pivot;
   (b) rectilinear linkage means actuable by said key lever means to turn about a central pivot point;
   (c) extension integrals with and projecting from said rectilinear linkage means at said pivot point;
   (d) plate means underlying the digit keys and adapted to be depressed upon depression of any of said digits keys;
   (e) bar means attached to and depending from said plate means; and
   (f) a notch of inverted T form in the end of said bar means remote from said plate means, said bar means being located so that said notch engages said extension means whereby motion of said key lever moves said rectilinear linkage means and said extension means so that said extension means underlies a shallow portion of said notch thus to prevent depression of said plate means and depression of said plate means moves said bar means to catch said extension means in the deeper portion of said notch thus to prevent motion of said extension means, said rectilinear linkage means and said key lever means.

7. In a calculator or like machine the combination comprising:
   (a) keyboard means including a plurality of digit keys an action key and a repeat key;
   (b) a data entry pin carriage built up from a plurality of segments in which each segment is provided with a plurality of integrally formed spring means and a plurality of notched data entry pins each engaged by one of said spring means so as to retain said data entry pins in either a first or second position by the action of said spring means;
   (c) collector means located proximate to and aligned with a single segment and a plurality of cables leading from said keyboard to said collector wherein each cable contains a push rod actuable from said keyboard by a digit key corresponding thereto to shift a corresponding data entry pin from its first position to its second position;
   (d) means actuable by any of said digit keys to effect successive stepping of said pin carriage through shifting a predetermined data entry pin in each segment from its first to its second position so that successive segments are aligned with said push rods;
   (e) power drive means and means actuable by said action key and operable through linkage means to effect return of said pin carriage to its initial position;
   (f) means actuable by said repeat key to disable said linkage means so as to prevent return of said pin carriage; and
   (g) interlocking lever means between said digit keys and said action key to prevent simultaneous depression of a digit key and actuation of said action key.

References Cited
UNITED STATES PATENTS

| | | | |
|---|---|---|---|
| 3,053,442 | 9/1962 | Bacher | 235—60 |
| 3,055,580 | 9/1962 | Tancred et al. | 235—60 |
| 3,095,143 | 6/1963 | Oldenburg et al. | 235—60 |
| 3,156,411 | 11/1964 | McEvoy | 235—60 |
| 3,312,392 | 4/1967 | Mark | 235—60 |

RICHARD B. WILKINSON, *Primary Examiner.*

S. A. WAL, *Assistant Examiner.*